United States Patent
Nemoto

(10) Patent No.: US 9,268,481 B2
(45) Date of Patent: Feb. 23, 2016

(54) USER ARRANGEMENT OF OBJECTS ON HOME SCREEN OF MOBILE DEVICE, METHOD AND STORAGE MEDIUM THEREOF

(75) Inventor: Masayuki Nemoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 209 days.

(21) Appl. No.: 13/597,748

(22) Filed: Aug. 29, 2012

(65) Prior Publication Data

US 2013/0050119 A1    Feb. 28, 2013

(30) Foreign Application Priority Data

Aug. 29, 2011 (JP) ................... 2011-186633
Aug. 29, 2012 (JP) ................... 2012-188758

(51) Int. Cl.
G06F 3/0481 (2013.01)
G06F 3/0486 (2013.01)
G06F 9/44 (2006.01)
G06F 3/0488 (2013.01)

(52) U.S. Cl.
CPC ............ *G06F 3/0488* (2013.01); *G06F 3/0481* (2013.01); *G06F 3/0486* (2013.01); *G06F 9/4443* (2013.01)

(58) Field of Classification Search
CPC .... G06F 3/0481; G06F 3/0486; G06F 9/4443
USPC .......... 345/173; 715/747, 778, 779, 810, 818, 715/855, 864, 769
See application file for complete search history.

(56) References Cited

U.S. PATENT DOCUMENTS

| | | | | |
|---|---|---|---|---|
| 5,812,128 | A * | 9/1998 | Sterling, IV | 715/762 |
| 6,043,817 | A * | 3/2000 | Bolnick et al. | 715/788 |
| 8,843,853 | B1 * | 9/2014 | Smoak et al. | 715/839 |
| 2003/0007017 | A1 * | 1/2003 | Laffey et al. | 345/862 |
| 2006/0080617 | A1 * | 4/2006 | Anderson et al. | 715/779 |
| 2006/0265588 | A1 * | 11/2006 | Lim et al. | 713/166 |
| 2008/0165160 | A1 | 7/2008 | Kocienda et al. | |
| 2009/0044150 | A1 * | 2/2009 | Liu et al. | 715/854 |
| 2009/0193361 | A1 * | 7/2009 | Lee et al. | 715/810 |
| 2009/0231285 | A1 * | 9/2009 | Duncan et al. | 345/173 |
| 2010/0090964 | A1 * | 4/2010 | Soo et al. | 345/173 |
| 2010/0295789 | A1 * | 11/2010 | Shin et al. | 345/168 |

(Continued)

FOREIGN PATENT DOCUMENTS

WO    2008086302 A1    7/2008

OTHER PUBLICATIONS

Video Reference—"How to move and rearrange IPHONE application icons," uploaded to YOUTUBE on Jan. 10, 2009 to the IPHONEAndKids channel, and can be viewed at http://www.youtube.com/watch?v=qnXoGnUU6ul (42 seconds) (screenshot of search and video page attached).*

(Continued)

*Primary Examiner* — Eric J Bycer
(74) *Attorney, Agent, or Firm* — Hauptman Ham, LLP

(57) ABSTRACT

According to an aspect, a device includes a touch screen display and a controller. The touch screen display displays a first home screen on which an icon and a first symbol corresponding to a second home screen are arranged. When the icon is placed and released on the first symbol, the controller moves the icon to the second home screen corresponding to the first symbol.

15 Claims, 12 Drawing Sheets

(56) References Cited

U.S. PATENT DOCUMENTS

| | | | | |
|---|---|---|---|---|
| 2011/0087982 | A1* | 4/2011 | McCann et al. | 715/769 |
| 2011/0252350 | A1* | 10/2011 | Chaudhri | 715/769 |
| 2011/0271182 | A1* | 11/2011 | Tsai et al. | 715/702 |
| 2012/0084692 | A1* | 4/2012 | Bae | 715/769 |
| 2012/0096396 | A1* | 4/2012 | Ording et al. | 715/799 |
| 2012/0165076 | A1* | 6/2012 | Yu et al. | 455/566 |
| 2012/0240083 | A1* | 9/2012 | Song et al. | 715/839 |
| 2012/0311466 | A1* | 12/2012 | Kluttz et al. | 715/760 |
| 2012/0311485 | A1* | 12/2012 | Caliendo et al. | 715/784 |
| 2012/0311498 | A1* | 12/2012 | Kluttz et al. | 715/825 |
| 2013/0151981 | A1* | 6/2013 | Green | 715/744 |

OTHER PUBLICATIONS

Video Reference—"How to move and rearrange IPHONE application icons," uploaded to YOUTUBE on Jan. 10, 2009 to the IPHONEAndKids channel, and can be viewed at http://www.youtube.com/watch?v=qnXoGnUU6u1 (42 secs) (Cover page explanation and 20 annotated screen captures of the video providing detailed descriptions of the actions from the video).*

Wimmer et al., "Evaluating the Usability of 1D Fisheye Lists," Proceedings of the IADIS International Conference on Interfaces and Human Computer Interaction, Jun. 2009. Retrieved on May 29, 2015 from http://www.iadisportal.org/ichi-2009-proceedings (cover) and http://web.arch.usyd.edu.au/~mtomitsch/publications/2009-ihci.pdf (publication). 7 pgs.*

Office Action mailed Mar. 17, 2015, corresponding to Japanese patent application No. 2012-188758, for which an explanation of relevance is attached.

Takahiro Shibata, Now you can use simple mini iPhone [carefully] app thorough use of skills, Dec. 25, 2010, p. 12 and 24, First edition, Gijyutsu-Hyoron Co., Ltd.

Hiroshi Shinoda, AR Pocket Guide, Jun. 30, 2010, p. 21-21, First edition, Mainichi Communications Co., Ltd.

Shigeto Arakawa, iPad Start Guide, Mac Fan, Jun. 1, 2010, p. 72, Mainichi Communications Co., Ltd.

Kaori Koyama, iPad Business Application Guide, Jul. 6, 2011, p. 28-31, First edition, Mainichi Communications Co., Ltd.

* cited by examiner

USER ARRANGEMENT OF OBJECTS ON HOME SCREEN OF MOBILE DEVICE, METHOD AND STORAGE MEDIUM THEREOF

CROSS-REFERENCE TO RELATED APPLICATIONS

This application claims priority from Japanese Application No. 2011-186633, filed on Aug. 29, 2011, and Japanese Application No. 2012-188758, filed on Aug. 29, 2012, the contents of which are incorporated by reference herein in their entireties.

BACKGROUND

1. Technical Field

The present disclosure relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen display. Then, the touch screen device operates according to the detected gesture. An example of the operation according to the detected gesture is described in, for example, International Publication No. WO 2008/086302.

The basic operation of the touch screen device is implemented by an operating system (OS) built into the device. Examples of the OS built into the touch screen device include, but are not limited to, ANDROID™, BLACKBERRY®, iOS®, SYMBIAN™, and WINDOWS PHONE® OSs.

Most touch screen devices display a screen that is called a home screen. On the home screen, objects that are called icons are arranged. When a specified gesture with respect to an icon is detected, the touch screen device executes a function corresponding to the icon to which the gesture has been performed.

Some touch screen devices are configured to provide a plurality of home screens, and change a home screen to be displayed on the touch screen display. Such a touch screen device not seldom have a user interface reconfiguration mode (adjustment mode) in which a user can adjust a home screen on which an icon is displayed and a position at which the icon is displayed on the home screen. The user of the touch screen device is allowed to change the icons that are displayed on the respective home screens when a mode is switched to the user interface reconfiguration mode.

There is a need for a device, a method, and a program that allow the user to adjust a display position of an icon on the home screen.

SUMMARY

According to an aspect, a device includes a touch screen display and a controller. The touch screen display displays a first home screen on which an icon and a first symbol corresponding to a second home screen are arranged. When the icon is placed and released on the first symbol, the controller moves the icon to the second home screen corresponding to the first symbol.

According to another aspect, a method is for controlling a device including a touch screen display. The control method includes: displaying a first home screen on which an icon and a first symbol corresponding to a second home screen are arranged on the touch screen display; detecting that the icon is placed and released on the first symbol; and moving the icon to the second home screen corresponding to the first symbol upon the detecting.

According to another aspect, a non-transitory storage medium stores a program. When executed by a device including a touch screen display, the program causes the device to execute: displaying a first home screen on which an icon and a first symbol corresponding to a second home screen are arranged on the touch screen display; detecting that the icon is placed and released on the first symbol; and moving the icon to the second home screen corresponding to the first symbol upon the detecting.

DETAILED DESCRIPTION

Exemplary embodiments of the present invention will be explained in detail below with reference to the accompanying drawings. A smartphone will be explained below as an example of a device provided with a touch screen display.

Figure 1:
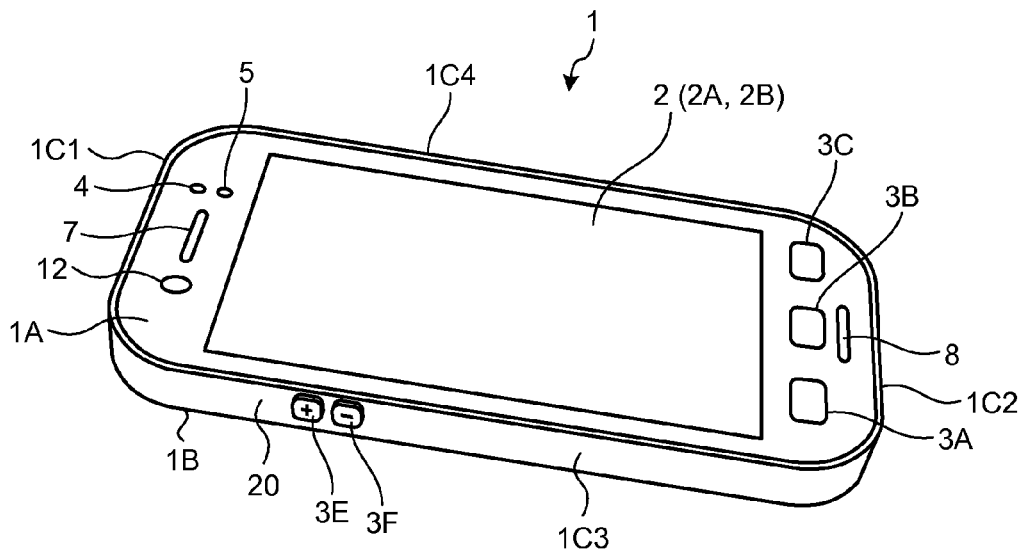
FIG. 1 is a perspective view of a smartphone according to an embodiment.
Figure 2:
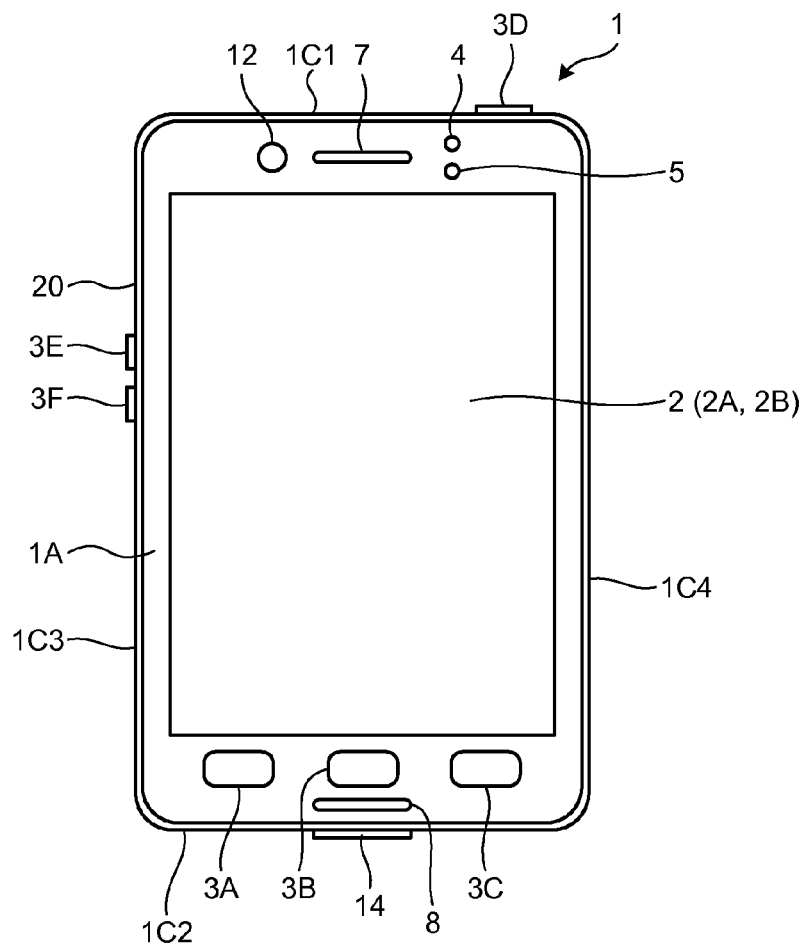
FIG. 2 is a front view of the smartphone.
Figure 3:
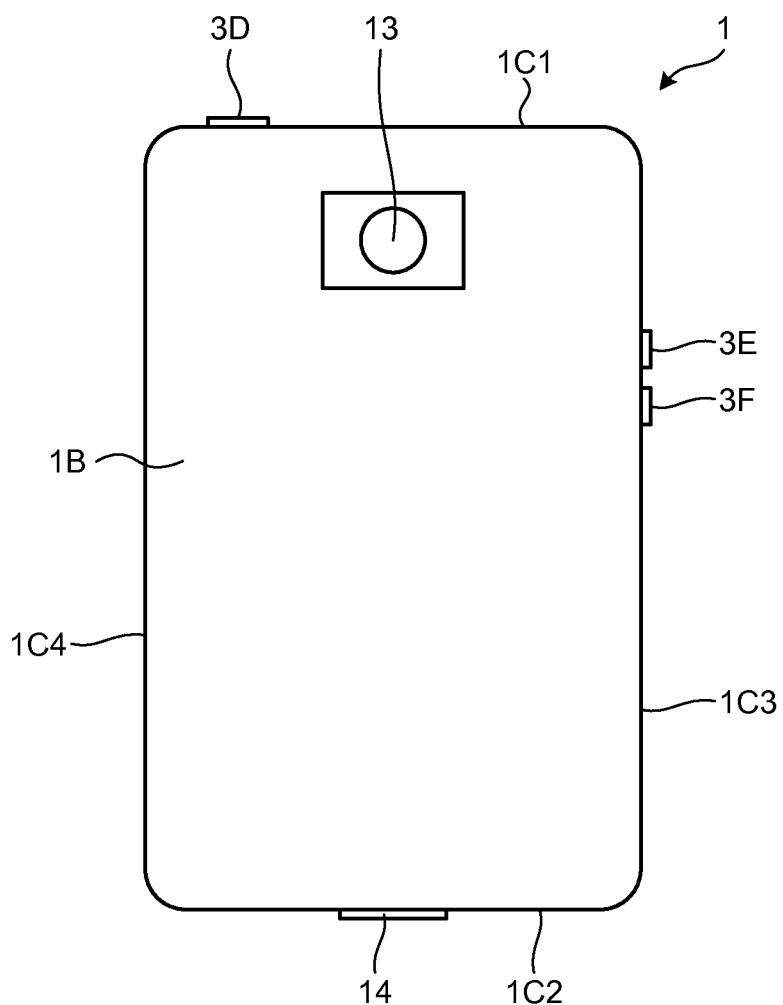
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a camera 13, which is provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (GELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B.

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X", "the controller detects X", "the touch screen detects X", or "the touch screen display detects X".

Figure 4:
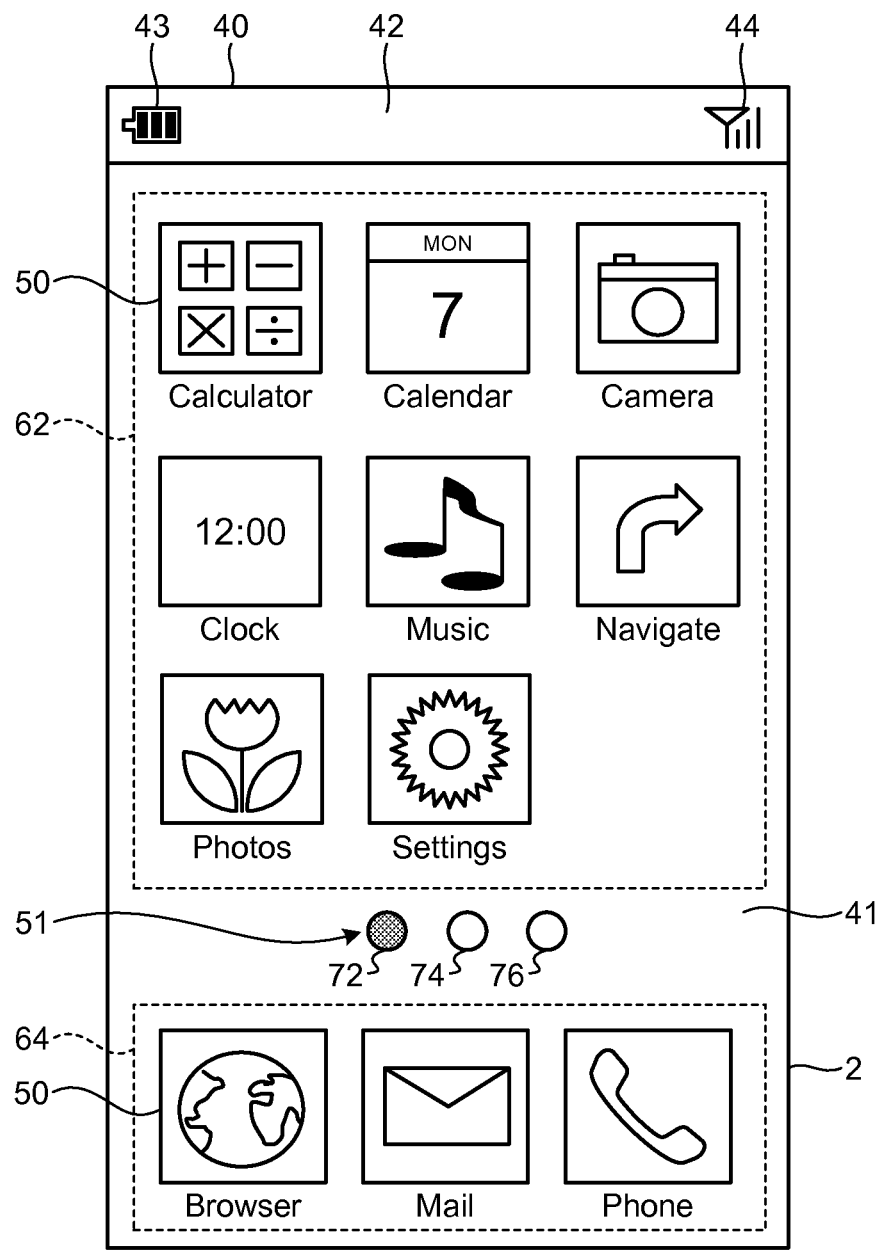
FIG. 4 is a diagram illustrating an example of a home screen.
Figure 5:
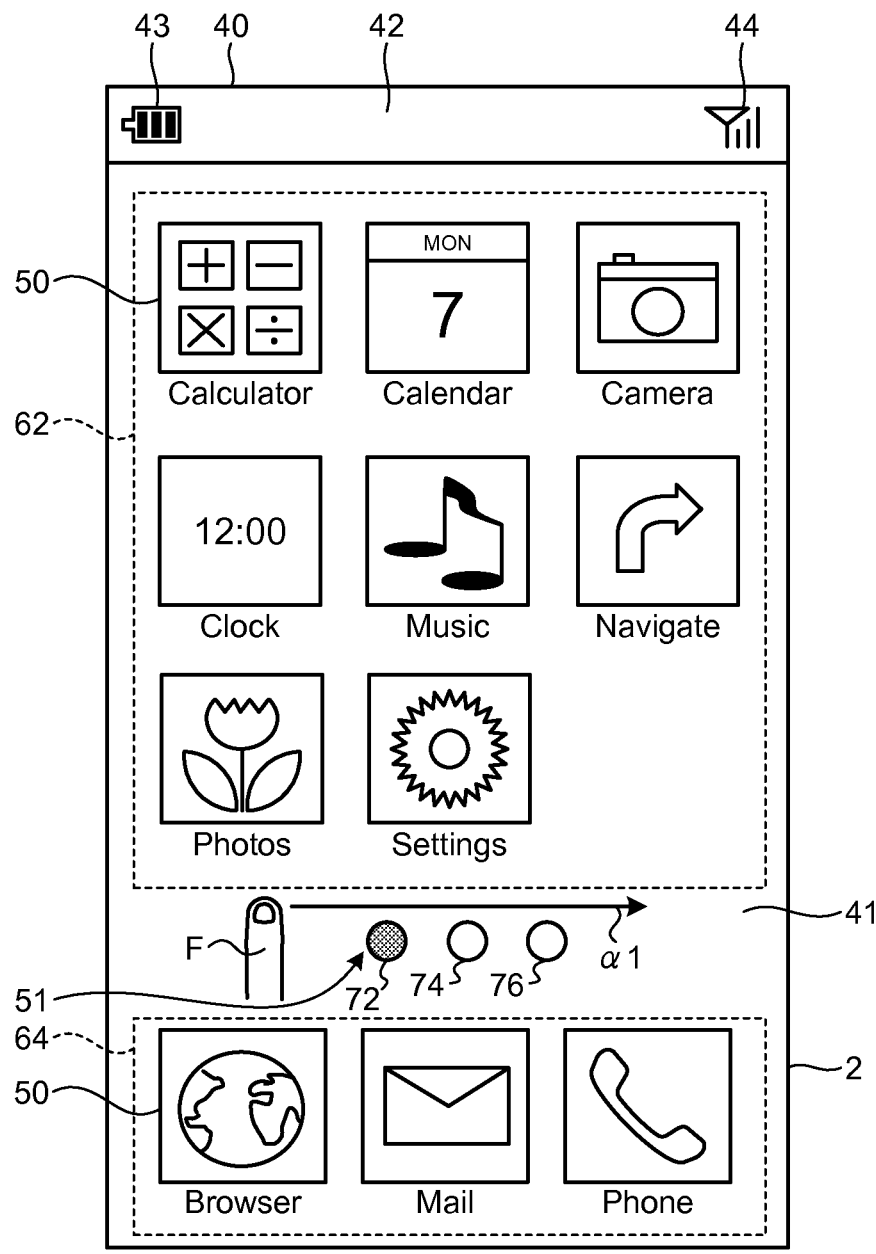
FIG. 5 is a diagram illustrating an example of a control used to move the home screen to be displayed.
Figure 6:
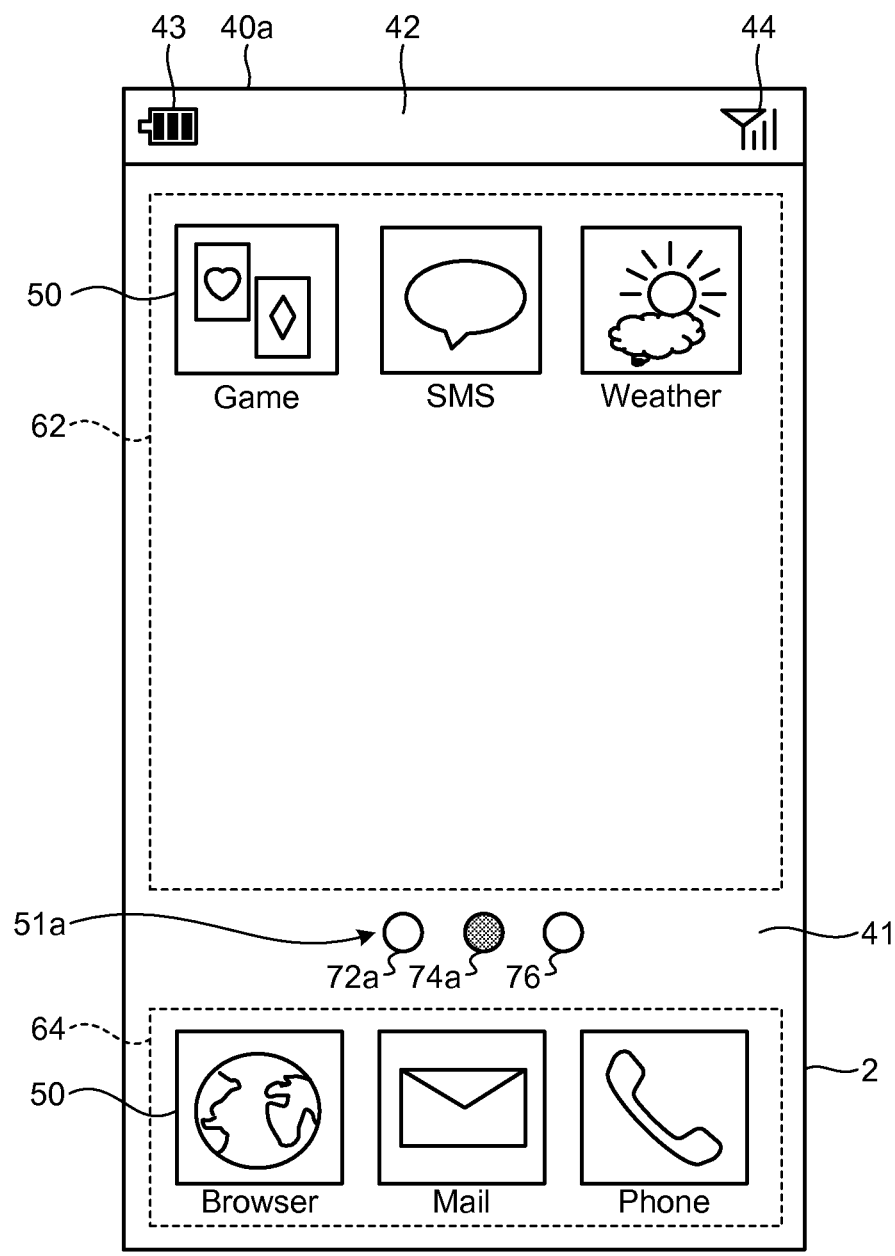
FIG. 6 is a diagram illustrating another example of the home screen.
Figure 7:
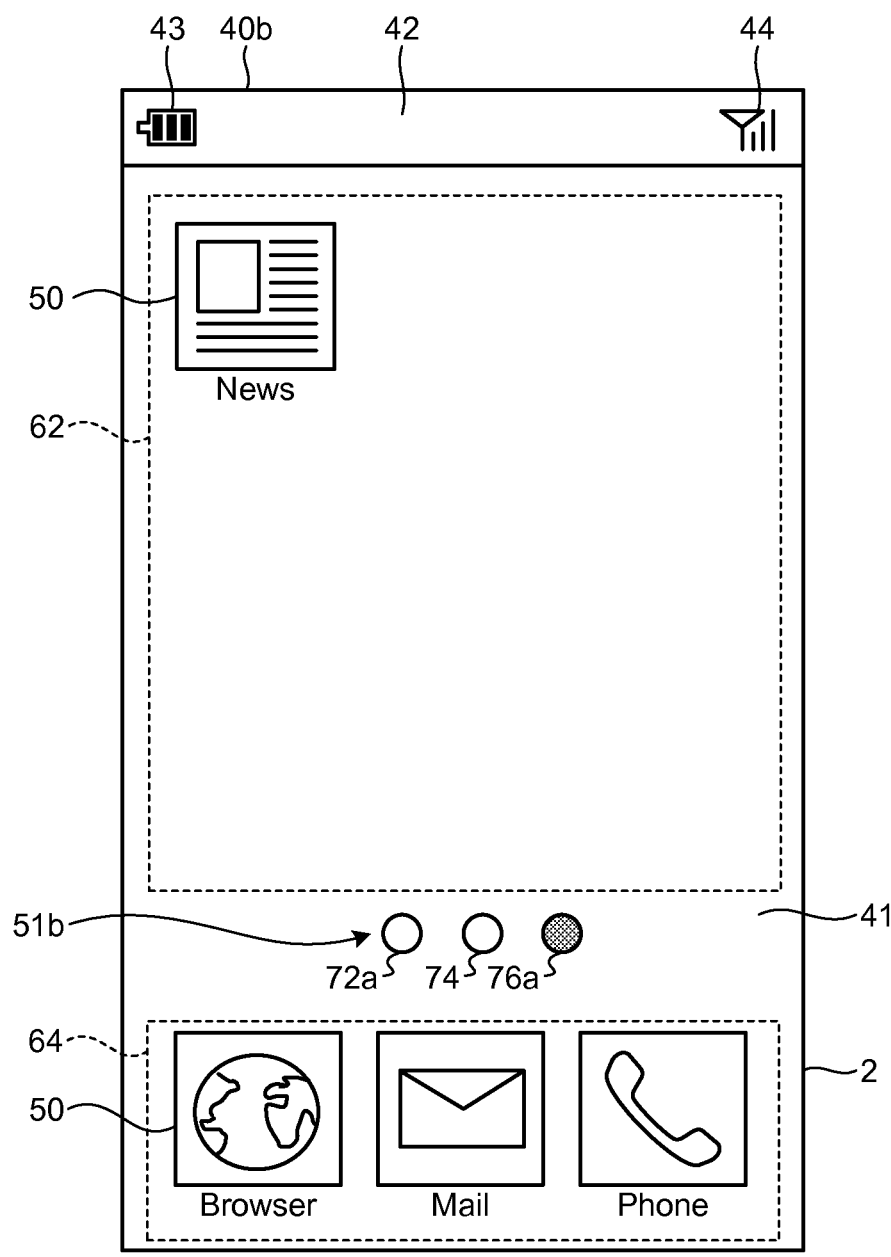
FIG. 7 is a diagram illustrating another example of the home screen.

Examples of the screens displayed on the display 2A will be explained below with reference to FIGS. 4 to 7. FIG. 4 represents an example of a home screen. FIG. 5 represents an example of a control used to move the home screen to be displayed. FIGS. 6 and 7 represent other examples of the home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

On a home screen 40 illustrated in FIG. 4, icons 50 are arranged in a first area 62 and a second area 64 provided on the home screen 40. On the home screen 40, eight icons 50 are arranged in the first area 62, and three icons 50 are arranged in the second area 64.

The first area 62 is an individual icon area in which icons 50 that correspond to the home screen 40 are displayed. When the home screen to be displayed on the touch screen display 2 is switched, the smartphone 1 displays the icons 50 that correspond to the home screen after the switching on the first area 62. The second area 64 is a common icon area in which icons that are common to all home screens are displayed. In the smartphone 1, even when the home screen to be displayed on the touch screen display 2 is switched, the icons 50 that are displayed on the second area 64 are not changed. That is, in the smartphone 1, even when the home screen is switched, the same icons 50 are displayed in the second area 64.

The smartphone 1 can include a plurality of home screens. The smartphone 1 determines, for example, the number of home screens according to setting by the user. The smartphone 1 displays a selected one on the display 2A even if there is a plurality of home screens. The smartphone 1 is configured to allow the user to adjust a number and positions of icons displayed on the home screen.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes three symbols 72, 74, and 76 that are displayed in an area between the first area 62 and the second area 64. This means there are three home screens. The three symbols 72, 74, and 76 are arranged in line and in the order of the symbol 72, the symbol 74, and the symbol 76 from the left side to the right side of the screen. Among the three home screens, a left home screen corresponds to the symbol 72, a center home screen corresponds to the symbol 74, and a right home screen corresponds to the symbol 76. According to the indicator 51 in the example illustrated in FIG. 4, the symbol 72 at the left end is displayed in a different manner from that of the symbols 74 and 76. This means that the left home screen is currently displayed.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

When a specified gesture is detected during the display of the home screen, the smartphone 1 switches the home screen to be displayed on the display 2A. For example, as illustrated in FIG. 5, a user may input an operation of bringing a finger F in contact with the touch screen display 2 and moving the finger F in an α1 direction in a state where a finger F is in contact with the touch screen display 2. The smartphone 1 detects the operation of movement of the finger F that is input by the user through the touch screen display 2 in the α1 direction as a swipe operation in the right direction. When the swipe operation in the right direction (or a right flick) is detected in a state where the home screen 40 illustrated in FIG. 4 is displayed, the smartphone 1 switches the home screen to be displayed on the display 2A from the home screen 40 to the home screen 40a on the left thereof as illustrated in FIG. 6. Three icons 50 are displayed in the first area 62 of the home screen 40a. The three icons 50 displayed in the first area 62 of the home screen 40a are different from eight icons 50 displayed in the first area 62 of the home screen 40. The three icons 50 displayed in the second area 64 of the home screen 40a are the same as the three icons 50 displayed in the second area 64 of the home screen 40. In the indicator 51a of the home screen 40a illustrated in FIG. 6, the center symbol 74a is displayed in a different manner from that of the other symbols 72a and 76. This means that the center home screen is currently displayed.

When a swipe operation in the right direction (a right flick) is detected in a state where the home screen 40a illustrated in FIG. 6 is displayed, the smartphone 1 switches the home screen to be displayed on the display 2A from the home screen 40a to the home screen 40b on the left thereof illustrated in FIG. 7. On the home screen 40b, one icon 50 is displayed in the first area 62. The one icon 50 that is displayed in the first area 62 of the home screen 40b is different from the eight icons 50 displayed in the first area 62 of the home screen 40 and from the three icons 50 displayed in the first area 62 of the home screen 40b. The three icons 50 displayed in the second area 64 of the home screen 40b are the same as the three icons 50 displayed in the second area 64 of the home screen 40. In the indicator 51b of the home screen 40b illustrated in FIG. 7, the right symbol 76a is displayed in a different manner from that of other symbols 72a and 74. This means that the right home screen is currently displayed. When a swipe operation in the left direction (a left flick) is detected, the smartphone 1 switches the home screen to be displayed on the display 2A to a home screen on the right of the home screen that is currently displayed.

The home screens illustrated in FIGS. 4 to 7 are only examples, and therefore the configuration of each of elements, the arrangement of the elements, the number of home screens, the way to perform each of operations on the home screen, and the like do not have to be like the above mentioned explanation.

Figure 8:
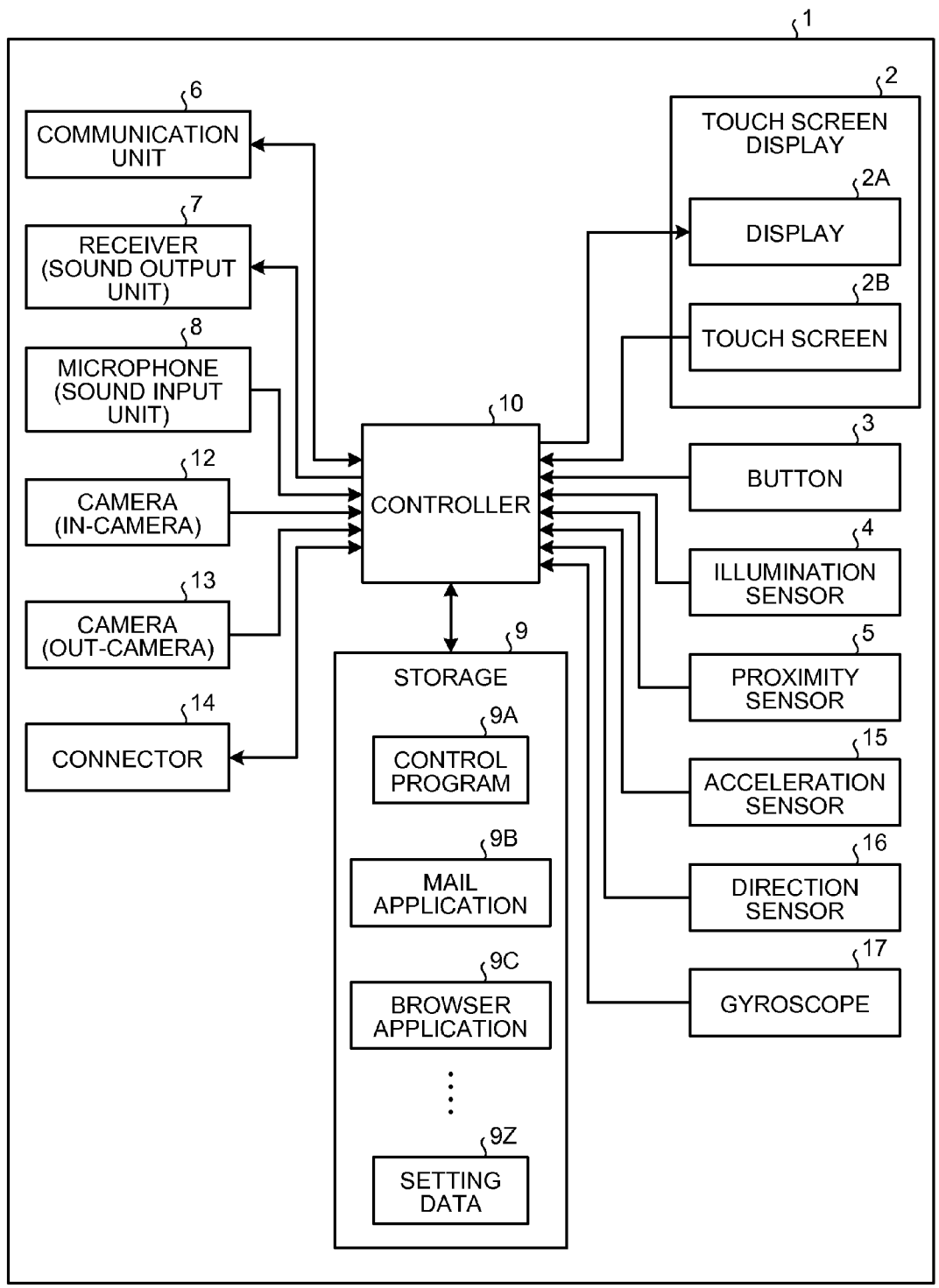
FIG. 8 is a block diagram of the smartphone.

FIG. 8 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects the presence of the nearby object, for example, when the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 is a sound output unit. The receiver 7 outputs a sound signal transmitted from the controller 10 as sound. The receiver 7 is used, for example, to output voice of the other party on the phone. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, and setting data 9Z. The mail application 9B provides e-mail functions for composition, transmission, reception, display, and the like of an e-mail. The browser application 9C provides WEB browsing functions for displaying WEB pages. The setting data 9Z includes information on various settings for operation of the smartphone 1.

The control program 9A provides various control functions for operating the smartphone 1. The control program 9A realizes communications by controlling, for example, a communication unit 6, a receiver 7, a microphone 8, and the like. Functions provided by the control program 9A include, but are not limited to, functions of performing various controls, such as changing information of a correlation between the home screen and the icons, depending on the gesture detected through the touch screen 2B. A function provided by the control program 9A may be combined and used with a function provided by another program such as a mail application 9B. The information of the correlation between the home screen and the icons is information of the correlation between respective positions of the respective home screens and the icons that are displayed on the corresponding positions. The control to change the information of the correlation between the home screen and the icons is a control to change the icons displayed on the home screen, to change the home screen for displaying the icons, or to change the positions on the home screen for displaying the icons.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, and the receiver 7. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes various kinds of controls, for example, to change the information of the correlation between the home screen and the icons depending on the gesture detected through the touch screen 2B by executing the control program 9A.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 8 may be downloaded from any other device through communication by the communication unit 6. Part or all of the programs and the data stored in the storage 9 in FIG. 8 may be stored in the non-transitory storage medium that can be read by the reader included in the storage 9. Part or all of the programs and the data stored in the storage 9 in FIG. 8 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 8 is only an example, and therefore it can be modified as required within a scope that does not depart from the gist of the present invention. For example, the number and the type of the button 3 are not limited to the example of FIG. 8. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 8, the smartphone 1 is provided with two cameras; however, the smartphone 1 may be provided with only one camera or with no camera. In the example of FIG. 8, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Now, examples of controls based on the functions provided by the control program 9A will be described with reference to FIGS. 9 to 12. The functions provided by the control program 9A include a function of changing the correlation between the icons and the home screen according to a user's instruction, specifically, a function to change the home screen on which the icon is displayed, a function of changing the display position of the icon on the home screen, etc. Hereinafter, a plurality of examples of changing the correlation between the icons and the home screen according to the user's instruction will be described.

Figure 9:
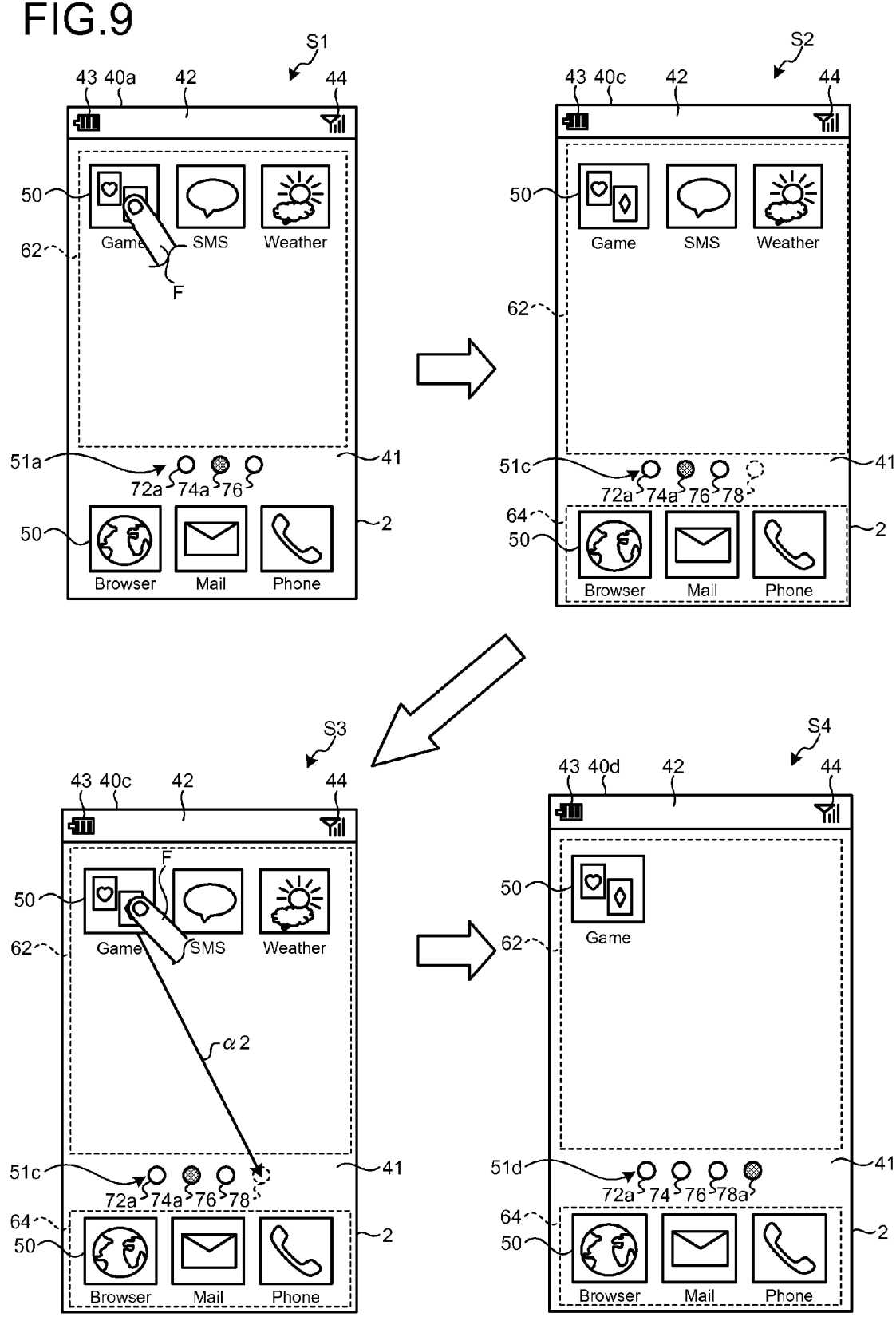
FIG. 9 is a diagram illustrating an example of a control in an adjustment mode.

At Step S1 illustrated in FIG. 9, the home screen 40a is displayed on the display 2A. At Step S1, the user's finger F makes a long tap with respect to a portion in which the left icon 50 ("Game" icon 50) among three icons 50 of the first area 62 is arranged. In this case, the smartphone 1 detects the long tap in the portion in which the left icon 50 of the first area 62 is arranged through the touch screen 2B. When the long tap is detected in the portion in which the left icon 50 of the first area 62 is arranged, the smartphone 1 shifts to an adjustment mode (user interface reconfiguration mode or icon rearrangement mode).

In the adjustment mode, as illustrated at Step S2, the smartphone 1 displays the home screen 40c on the touch screen display 2. The home screen 40c is the same as the home screen 40a except that the indicator 51c differs. The indicator 51c has a symbol 72a, a symbol 74a, a symbol 76, and a symbol 78. The symbol 72a, the symbol 74a, and the symbol 76 are symbols that correspond to the same home screen as the symbols of the indicator 51a. The symbol 74a is a symbol that corresponds to the home screen that is currently displayed, and is displayed in a different manner from that of the symbols 72a and 76. The symbol 78 is a symbol that corresponds to a home screen that is not provided in the state at Step S1, that is, a home screen that can be newly added. The symbol 78 is displayed in a different manner to any of the symbols 72a, 74a, and 76. Specifically, the symbol 78 is indicated by a dotted line.

At Step S3, the user's finger F drops the left icon 50 ("Game" icon 50) among the three icons 50 of the first area 62 onto the symbol 78. That is, the user makes the finger F touch the area in which the "Game" icon 50 is displayed, and then releases the finger F in the area in which the symbol 78 is displayed through dragging in a path indicated by an arrow α2. In this case, the smartphone 1 detects the drop having a start point that is the portion in which the left icon 50 of the first area 62 is arranged and an end point that is the portion in which the symbol 78 is arranged through the touch screen 2B. When the drop is detected, the smartphone 1 creates a home screen that corresponds to the symbol 78, and sets the "Game" icon 50 as the icon that is to be displayed on the created home screen. That is, the smartphone 1 newly creates the fourth home screen that corresponds to the symbol 78, and sets the "Game" icon 50 as an icon that is to be displayed on the fourth home screen. While the drag of the icon 50 is detected, the smartphone 1 may display the icon 50 in the position where the contact is detected through the drag. That is, in the case of detecting the drag of the icon 50, the smartphone 1 may move and display the dragged icon 50 so as to match the movement of the finger F.

At Step S4, the newly set home screen 40d is displayed on the touch screen display 2. The user terminates the adjustment mode and inputs an operation for displaying the fourth home screen as counted from the left, that is, the right home screen, to the smartphone 1. The user inputs, for example, a swipe operation as an operation for moving the home screen to be displayed on the touch screen display 2. When the operation input by the user is detected through the touch screen 2B, the smartphone 1 displays a newly set home screen 40d on the touch screen display 2. On the home screen 40d, one icon 50 is displayed in the first area 62. The one icon displayed in the first area 62 is the "Game" icon 50 that has been moved at Step S3. The three icons 50 displayed in the second region 64 of the home screen 40d are the same as the three icons 50 displayed in the second area 64 of the home icon 40. The indicator 51d of the home screen 40d illustrated in Step S4 of FIG. 9 includes four symbols 72a, 74, 76, and 78a. This means that the number of home screens is four. The four symbols 72a, 74, 76, and 78a are arranged in line and in the order of the symbol 72a, the symbol 74, the symbol 76, and the symbol 78a from the left side to the right side of the screen. This indicates that the symbol 78a corresponds to the newly added home screen.

In the indicator 51d, the right symbol 78a is displayed in a different manner from that of other symbols 72a, 74, and 76. This means that the right home screen is currently displayed.

Figure 10:
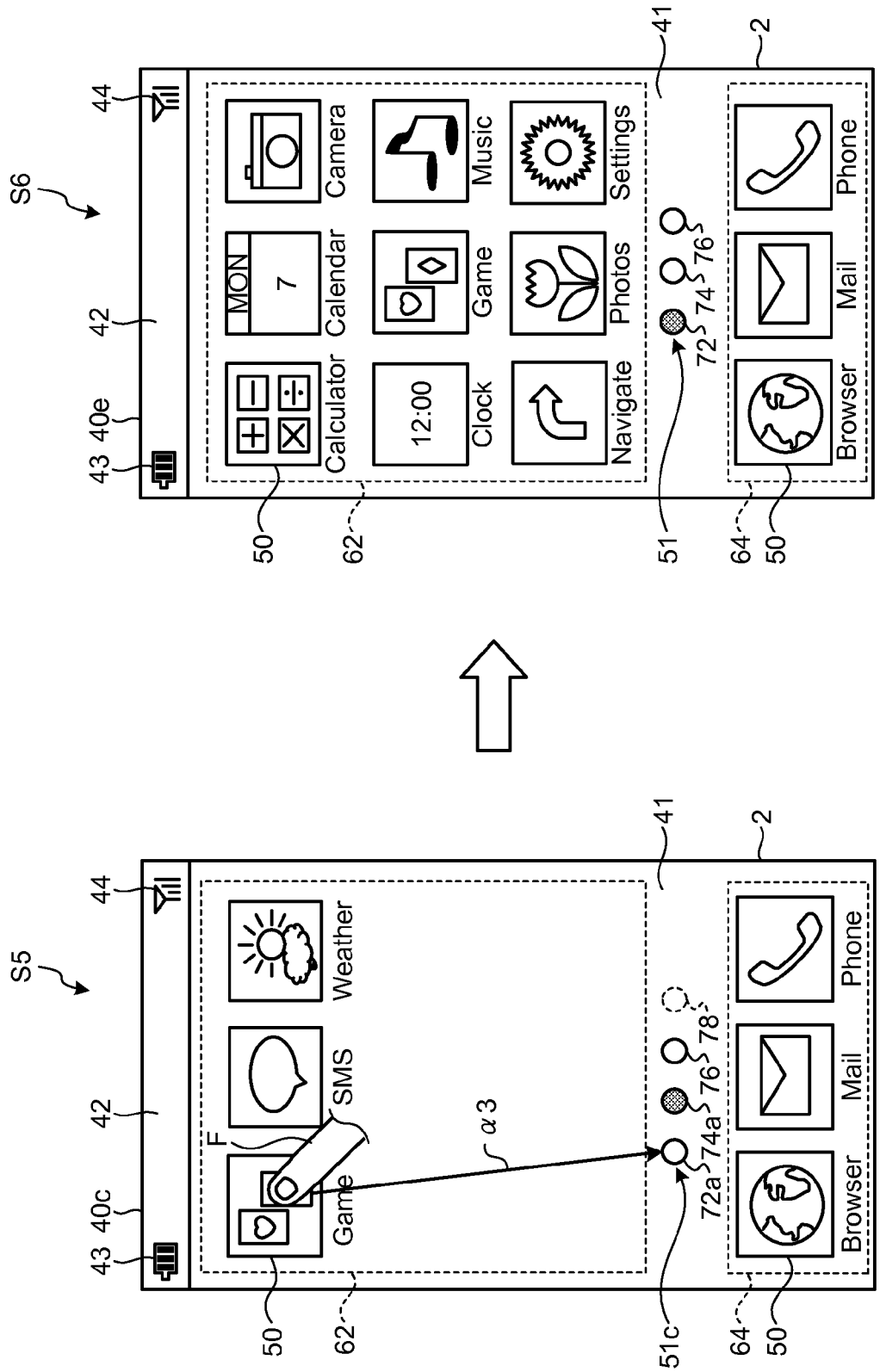
FIG. 10 is a diagram illustrating an example of the control in the adjustment mode.

Then, another example of changing the correlation between the icons and the home screens according to the user's instruction will be described with reference to FIG. 10. The example illustrated in FIG. 10 represents the process performed after the process at Step S2 illustrated in FIG. 9 is performed. That is, in the example illustrated in FIG. 10, the same processes as those illustrated in FIG. 9 are performed before the activating of the adjustment mode.

At Step S5, the user's finger F drops the left icon 50 ("Game" icon 50) among the three icons 50 of the first area 62 onto the symbol 72a. That is, the user makes the finger F touch the area in which the "Game" icon 50 is displayed, and then releases the finger F in the area in which the symbol 72a is displayed through dragging in a path indicated by an arrow α3. In this case, the smartphone 1 detects the drop having a start point that is the portion in which the left icon 50 of the first area 62 is arranged and an end point that is the portion in which the symbol 72a is arranged through the touch screen 2B. When the drop is detected, the smartphone 1 sets the "Game" icon 50 as the icon that is to be displayed on the home screen 40. That is, the smartphone 1 sets the "Game" icon 50 as the icon that is to be displayed on the left home screen 40.

At Step S6, the home screen 40e is displayed on the touch screen display 2. The user inputs an operation for displaying the left home screen to the smartphone 1 after terminating the adjustment mode. The user inputs, for example, a swipe operation as an operation for moving the home screen to be displayed on the touch screen display 2. When the operation input by the user is detected through the touch screen 2B, the smartphone 1 displays the home screen 40e that corresponds to the symbol 72 on the touch screen display 2. On the home screen 40e, nine icons 50 are displayed in the first area 62. The nine icons 50 displayed in the first area 62 includes eight icons 50 that have been associated with the home screen 40 since before the execution of the adjustment mode and the "Game" icon 50 that has moved at Step S5. On the home screen 40e, the nine icons 50 are displayed in an automatic alignment manner in the first area 62. That is, the smartphone 1 determines the display order of the eight icons 50 that have been associated with the home screen 40 since before the execution of the adjustment mode and the "Game" icon 50 based on the set rule. The smartphone 1 displays the icons on the touch screen display 2 in the determined order. In this embodiment, the display order of the icons is determined with the alphabetical order of the name of the icon. On the home screen 40e, the "Game" icon 50 is arranged between a "Clock" icon 50 and a "Music" icon 50. The three icons 50 displayed in the second area 64 of the home screen 40e are the same as the three icons 50 displayed in the second area 64 of the home screen 40. The indicator 51 of the home screen 40e illustrated in Step S6 of FIG. 10 is the same as the indicator of the home screen 40. This means that the number of home screens is three. As described above, when the icon 50 is not moved to the symbol 78 newly displayed in the adjustment mode, the smartphone 1 maintains the number of home screens with the same number before the adjustment mode without addition of the home screen.

As described above, when the icon is dropped onto the symbol in the adjustment mode, the smartphone 1 moves the dropped icon to the home screen that corresponds to the symbol onto which the icon is dropped. By dropping the icon onto the symbol, the user can move the icon to a different home screen. That is, by dropping the icon onto the symbol, the user can change the correlation between the icon and the home screens, and change the home screen on which the icon is displayed. As a result, the user can move the icon between the home screens in simple operation and a short time.

The smartphone 1 displays the symbol that corresponds to the new home screen during the execution of the adjustment mode, and when an icon is dropped onto a symbol that corresponds to the new home screen as illustrated in FIG. 9, the smartphone 1 newly creates a home screen, and moves the dropped icon onto the newly created home screen. Thus, the addition of the home screen can be easily performed.

When the dragged icon and the symbol of the indicator overlap each other during the execution of the adjustment mode, the smartphone 1 may change the display of the indicator. Specifically, the smartphone 1 may display the indicator in a manner that the symbol that overlaps the dragged icon can be easily distinguished from other symbols. Accordingly, the user can clearly understand the home screen to which the dragging icon is moved.

Figure 11:
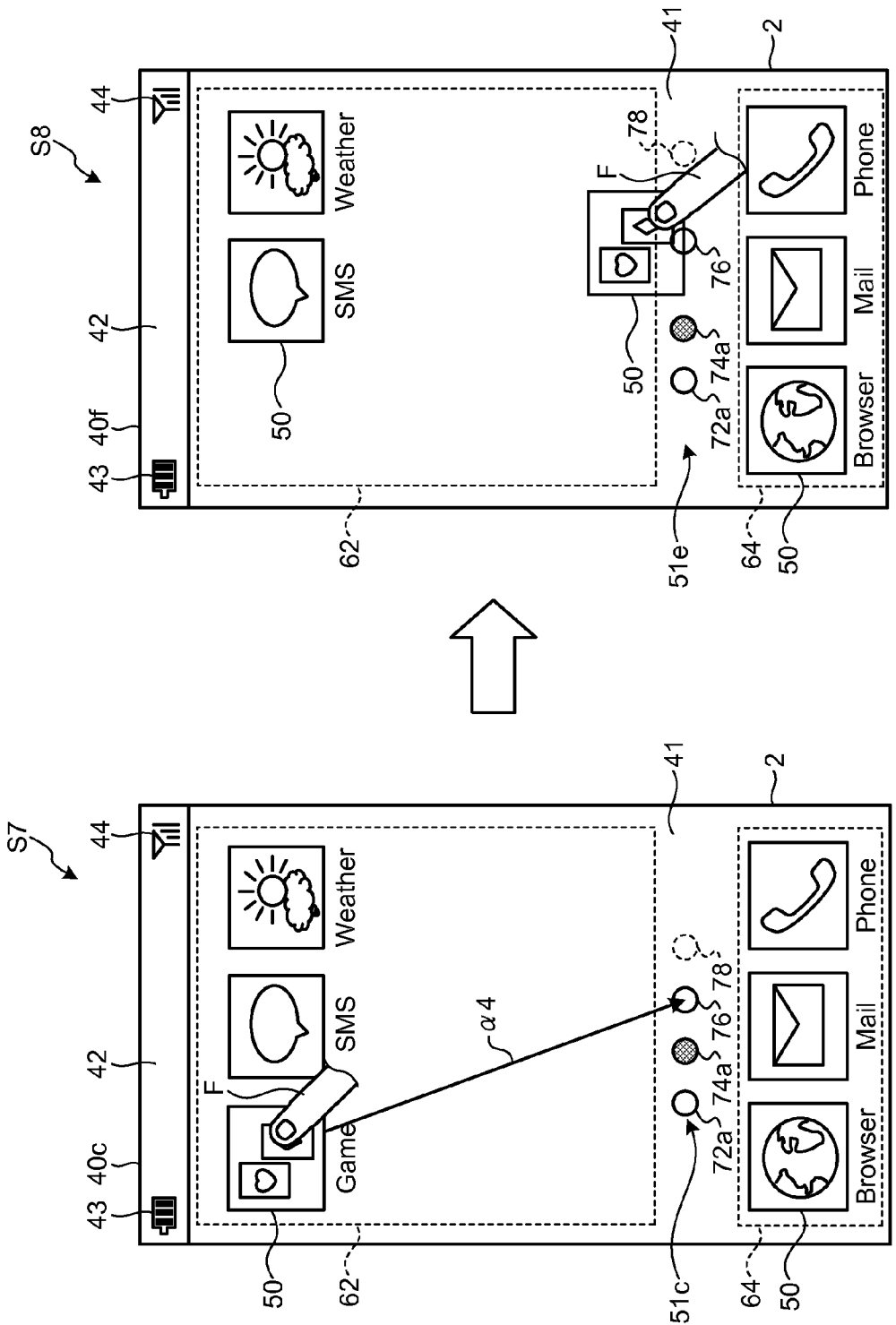
FIG. 11 is a diagram illustrating an example of the control in the adjustment mode.

FIG. 11 is a diagram illustrating an example of the control in the adjustment mode. The example illustrated in FIG. 11 represents the process performed after the process at Step S2 illustrated in FIG. 9 is performed. That is, in the example illustrated in FIG. 11, the same processes as those illustrated in FIG. 9 are performed before the activating of the adjustment mode.

At Step S7, the user's finger F drags the left icon 50 ("Game" icon 50) among the three icons 50 of the first area 62 onto the symbol 76. That is, the user makes the finger F touch the area in which the "Game" icon 50 is displayed, and then makes a touch in the area in which the symbol 76 is displayed through dragging in a path indicated by an arrow α4. In this case, the smartphone 1 detects the drag having a start point that is the portion in which the left icon 50 of the first area 62 is arranged and an end point that is the portion in which the symbol 76 is arranged through the touch screen 2B.

When the drag having the end point that is the portion in which the symbol 76 is arranged is detected, the smartphone 1 displays the home screen 40f on the touch screen display 2 as illustrated at Step S8. The home screen 40f is the same as the home screen 40c except that the indicator 51e differs. In the same manner as the indicator 51c, the indicator 51e has the symbol 72a, the symbol 74a, the symbol 76, and the symbol 78. In the indicator 51e, the distance between the symbol 76 and the symbol 74a and the distance between the symbol 76 and the symbol 78 are displayed to be longer than the distance between the symbol 72a and the symbol 74a. That is, in the indicator 51e, in comparison to the indicator 51c, the symbol 72a, the symbol 74a, and the symbol 78 are displayed in positions apart from the "Game" icon 50. In the indicator 51e, the symbol 76 is displayed in a position that overlaps the "Game" icon 50.

As illustrated in FIG. 11, the smartphone 1 displays the symbols except for the symbol that overlaps the dragged icon 50 to be apart from the dragged icon 50, and thus the user can easily recognize that the icon 50 and the symbol 76 overlap each other. Accordingly, the user can recognize more clearly that the home screen that is targeted for movement of the icon 50 is the home screen corresponding to the symbol 76.

In the example, when the dragged icon and the indicator symbol overlap each other during the execution of the adjustment mode, the display positions of the respective symbols of the indicator is changed depending upon the symbol that overlaps the icon; however a manner in which the display of the indicator is changed is not limited thereto. The smartphone 1 may display the symbol that overlaps the icon with different display features, for example, different color, size, or the like, from other symbols. Specifically, the smartphone 1 may display the symbol that overlaps the icon with a larger size or with an outstanding color.

The smartphone 1 may set the operation for activating the adjustment mode as an operation other than the long tap to the icon 50. The smartphone 1 may set another gesture, such as flick, pinch in, or pinch out, as the operation for activating the adjustment mode. The smartphone 1 may set an operation other than the gestures performed with respect to the touch screen display 2 as the operation for activating the adjustment mode. For example, the smartphone 1 may set an operation detected through a button 3, an operation of shaking the smartphone 1 detected through the acceleration sensor 15 or the like, or an operation via voice as the operation for activating the adjustment mode. The operation via voice, for example, may be realized in a manner that the controller 10 performs voice recognition process with respect to a sound signal transmitted from a microphone 8. The operation via voice may be realized in a manner that the sound signal transmitted from the microphone 8 is transmitted to another device through a communication unit 6 and the result of the voice recognition process performed by another device is used as the operation via voice.

Figure 12:
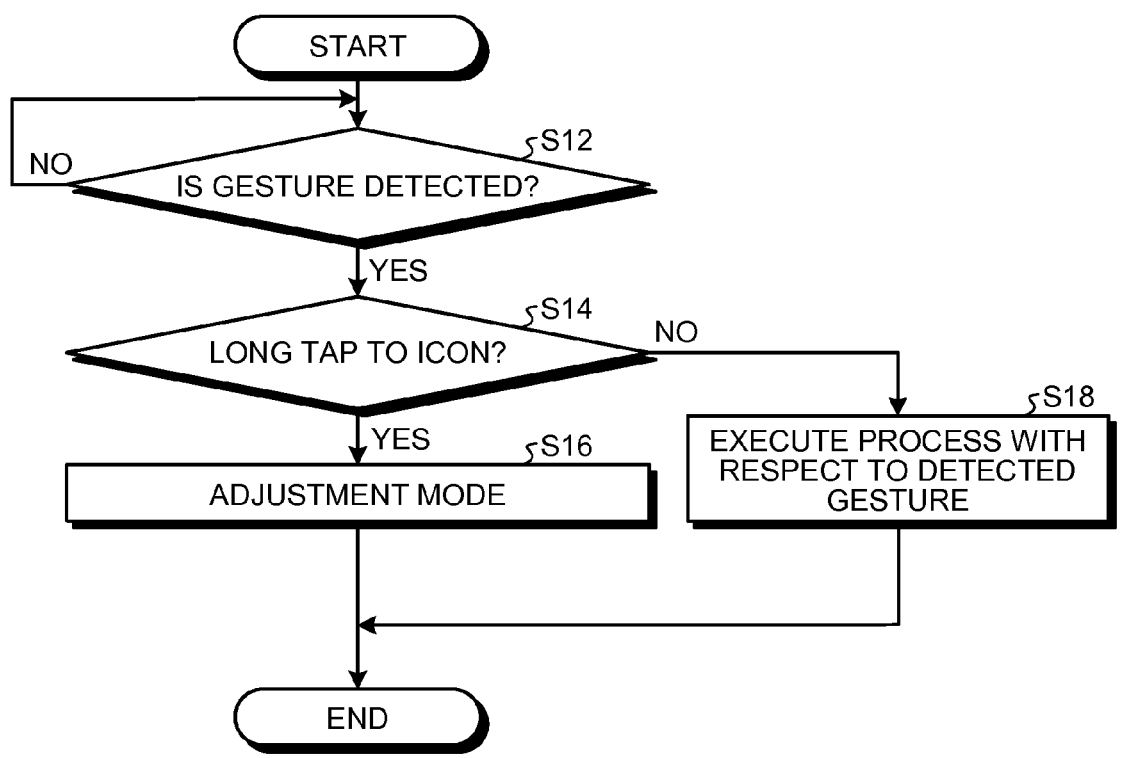
FIG. 12 is a flowchart illustrating a processing procedure of a control performed while the home screen is displayed.
Figure 13:
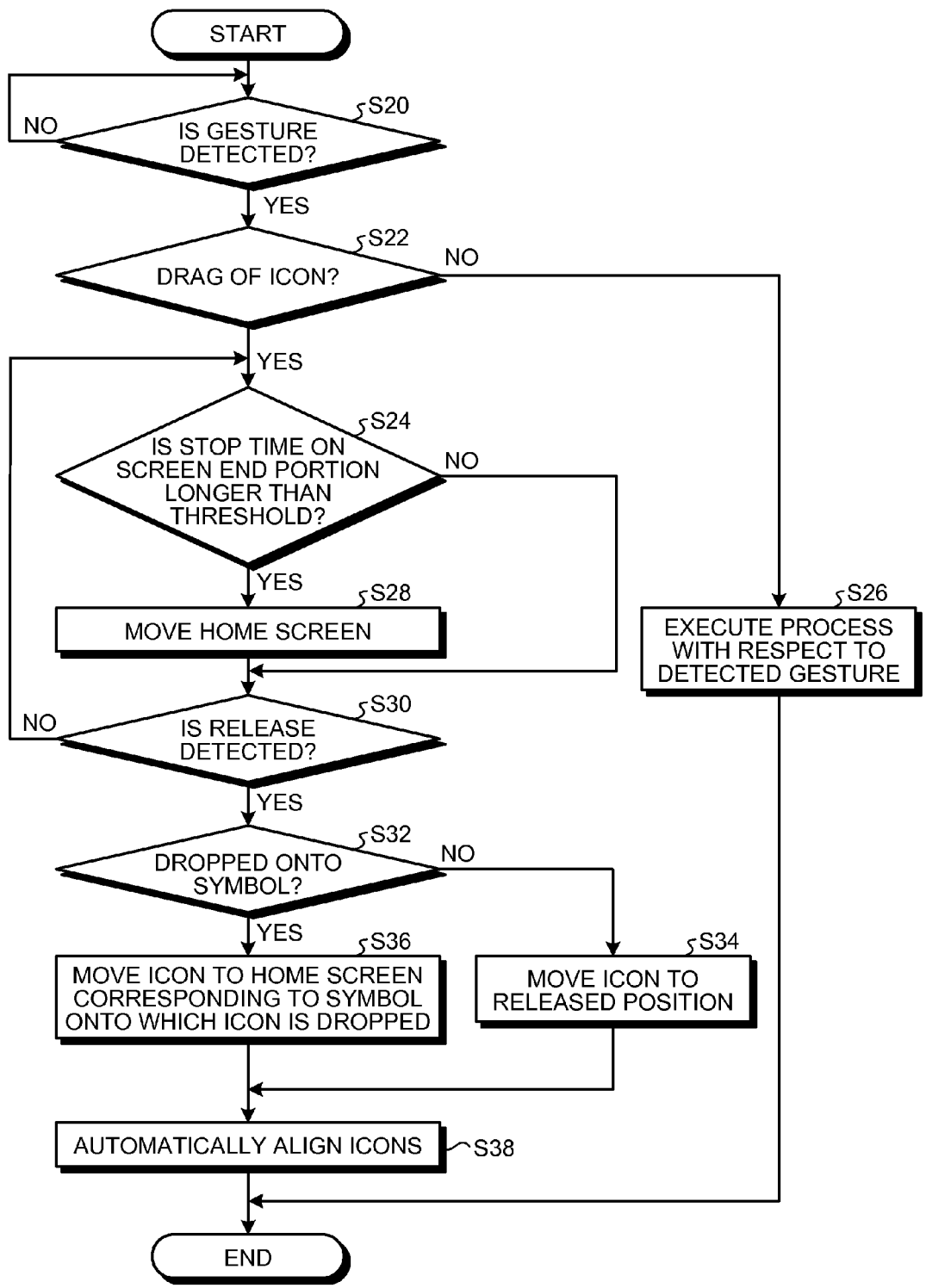
FIG. 13 is a flowchart illustrating a processing procedure of the control in the adjustment mode.

Now, examples of control processes based on the functions provided by the control program 9A will be described with reference to FIGS. 12 and 13. FIG. 12 illustrates the processing procedure of a control performed while a home screen is displayed, and FIG. 13 illustrates the processing procedure of the control in the adjustment mode. The processing procedures illustrated in FIGS. 12 and 13 are performed by the controller 10 that executes the control program 9A. The processing procedure illustrated in FIG. 12 is repeatedly performed while the home screen 40 is displayed on the display 2A. The controller 10 may execute another processing procedure for control about the home screen 40 in parallel to the processing procedure illustrated in FIG. 12. The processing procedure illustrated in FIG. 13 is repeatedly performed while the adjustment mode is executed.

At Step S12, the controller 10 acquires the detection result of the touch screen 2B, and determines whether a gesture has been detected on the basis of the acquired detection result. When it is determined that the gesture has not been detected at Step S12 ("No" at Step S12), the controller 10 proceeds to Step S12. That is, the controller 10 repeats the process at Step S12 until the gesture is detected through the touch screen 2B.

When it is determined that the gesture has been detected at Step S12 ("Yes" at Step S12), the controller 10 determines whether the gesture is a long tap to the icon at Step S14. That is, the controller 10 determines whether the gesture detected at Step S12 is a long tap to the icon. When it is determined that the detected gesture is the long tap to the icon at Step S14 ("Yes" at Step S14), the controller 10 shifts to the adjustment mode at Step S16, and terminates the process. When it is determined that the detected gesture is not the long tap to the icon at Step S14 ("No" at Step S14), the controller 10 executes a process with respect to the detected gesture at Step S18, and terminates the corresponding process. Example of the process with respect to the detected gesture include various processes that are executed while the controller 10 displays the home screen, such as execution process of an application that corresponds to the icon, movement of the home screen, and the like.

Then, a process during the execution of the adjustment mode will be described with reference to using FIG. 13. At Step S20, the controller 10 acquires the detection result of the touch screen 2B, and determines whether or not a gesture has been detected on the basis of the acquired detection result. When it is determined that the gesture has not been detected at Step S20 ("No" at Step S20), the controller 10 proceeds to Step S20. That is, the controller 10 repeats the process at Step S20 until the gesture is detected from the touch screen 2B.

When it is determined that the gesture has been detected at Step S20 ("Yes" at Step S20), the controller 10 determines whether the gesture is a drag at Step S22. That is, the controller 10 determines whether the gesture detected at Step S20 is the drag of the icon. When it is determined that the detected gesture is the drag of the icon at Step S22 ("Yes" at Step S22), the controller 10 proceeds to Step S24. When it is determined that the detected gesture is not the drag of the icon at Step S22 ("No" at Step S22), the controller 10 executes a process with respect to the detected gesture at Step S26, and terminates the corresponding process.

The controller 10 determines whether a stop time on a screen end portion is longer than a threshold time value at Step S24. That is, the controller 10 determines whether or not the dragged icon is kept in a stop state on the screen end portion for a period of a time that is longer than the threshold time value. When it is determined that the stop time on the screen end portion is longer than the threshold time value at Step S24 ("Yes" at Step S24), the controller 10 moves the home screen at Step S28. Specifically, the controller 10 changes the home screen to be displayed to a home screen that is near to the screen end portion side while keeping the icon in a dragged state. After performing the process at Step S28, the controller 10 proceeds to Step S30.

When it is determined that the stop time on the screen end portion is not longer than the threshold time value at Step S24 ("No" at Step S24), or after performing the process at Step S28, the controller 10 determines whether or not a release has been detected at Step S30. That is, the controller 10 determines whether or not the contact of the drag has been terminated at Step S30.

When it is determined that the release has not been detected ("No") at Step S30, that is, when it is determined that the icon is being dragged, the controller 10 proceeds to Step S24 to repeat the above-described process. When it is determined that the release has been detected at Step S30 ("Yes"), that is, when it is determined that the drag of the icon has been terminated, the controller 10 determines whether or not the icon has been dropped onto a symbol of the indicator at Step S32. That is, the controller 10 determines whether or not the release detected at Step S30 has been positioned in a region in which a symbol is displayed.

When it is determined that the icon has not been dropped onto a symbol at Step S32 ("No"), the controller 10 moves the icon to the released position at Step S34. Specifically, the controller 10 determines the position on the home screen on which the dragged and released icon is displayed as the released position. Thereafter, the controller 10 proceeds to Step S38.

When it is determined that the icon has been dropped onto the symbol at Step S32 ("Yes"), the controller 10 moves the icon to the home screen corresponding to the symbol onto which the icon has been dropped at Step S36. That is, the controller 10 moves the dropped icon to the home screen that corresponds to the symbol that is displayed on the dropped position. Thereafter, the controller 10 proceeds to Step S38.

After performing the process at Step S34 or the process at Step S36, the controller 10 automatically aligns the icons at Step S38, and terminates the corresponding process. The controller 10 performs the automatic alignment of the icons with respect to both the home screen that is the origin of the movement of the icon and the home screen of the destination of the icon.

In the example of the process illustrated in FIG. 13, through the processes at Step S24 and Step S28, the home screen is moved when the dragged icon is kept at the screen end portion for a predetermined time. However, this process may not be necessarily performed.

In the example of the process illustrated in FIG. 13, the icons are automatically aligned at Step S38, and the icons can be displayed in an aligned state with respect to both the home screen that is the origin of the movement of the icon and the home screen of the destination of the icon. However, the automatic alignment of the icons may not be necessarily performed. For example, the icon that has moved to the home screen may be displayed at the tail end of icons on the home screen of the destination.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
    a touch screen display for displaying a first home screen on which an icon and a first symbol corresponding to a second home screen are arranged; and
    a controller for moving, when the icon is placed and released on the first symbol, the icon to the second home screen corresponding to the first symbol,
    wherein the touch screen display is configured to display, on the first home screen, a second symbol corresponding to a third home screen to be created, in an adjustment mode in which an arrangement of icons on the displayed home screen is adjusted,
    wherein the touch screen display is configured to display, on the first home screen, a third symbol corresponding to the first home screen,
    wherein the touch screen display is configured to display, on the first home screen and before the icon is moved, the second symbol in a different manner from that of the first and third symbols, and
    wherein the controller is configured to
        when the icon is placed and released on the first symbol, move the icon to the second home screen, and keep displaying the first home screen,
        when the icon is placed and released on the second symbol,
            create the third home screen,
            move the icon to the third home screen, and
            keep displaying the first home screen, and
        when the icon is kept in a stop state on an end portion of the first home screen for a period of a time longer than a threshold time,
            display the second home screen, and
            move said icon to the second home screen when said icon is placed and released on an area in the second home screen, said area excluding the first, second and third symbols.

2. The device according to claim 1, wherein
the controller is configured to align the moved icon in the home screen to which the icon is moved.

3. The device according to claim 1, wherein
the touch screen display is configured to display, on the first home screen, the third symbol in a different manner from that of the first and second symbols.

4. The device according to claim 1, wherein
the controller is configured to move the third symbol away from the first symbol on the first home screen when the icon is placed on the first symbol.

5. The device according to claim 1, wherein
the controller is configured to change a manner in which the first symbol is displayed when the icon is placed on the first symbol.

6. The device according to claim 1, wherein the controller is configured to shift to the adjustment mode when a predetermined gesture is detected.

7. The device according to claim 1, wherein
the controller is configured to, upon completion of said moving the icon to the second home screen, automatically align all icons displayed in the second home screen in accordance with a preset alignment order for the second home screen.

8. The device according to claim 1, wherein
the controller is configured to, upon completion of said moving the icon to the second home screen, automatically align all icons displayed in the second home screen in alphabetical order.

9. The device according to claim 1, wherein
the controller is configured to, upon completion of said moving the icon to the second home screen, automatically place the icon between a pair of icons displayed in the second home screen, and
the pair of icons were present within the second home screen prior to said moving the icon to the second home screen.

10. The device according to claim 1, wherein, in the adjustment mode,
the touch screen display is configured to display, on the first home screen, a plurality of symbols corresponding to a plurality of home screens, the plurality of symbols including the first, second and third symbols, and
the controller is configured to, when the icon is placed, but not yet released, on a selected symbol among the plurality of symbols, move the other symbols away from the selected symbol so that distances between the selected symbol and symbols adjacent to the selected symbol are greater than a distance between each pair of adjacent symbols among the other symbols.

11. The device according to claim 1, wherein, in the adjustment mode,
the touch screen display is configured to display, on the first home screen, a plurality of symbols corresponding to a plurality of home screens, the plurality of symbols including the first, second and third symbols, and
the controller is configured to,
    when the icon is placed, but not yet released, on a selected symbol among the plurality of symbols, move the other symbols away from the selected symbol so that (i) distances between the selected symbol and symbols adjacent to the selected symbol are greater than a distance between each pair of adjacent symbols among the other symbols and (ii) sizes of the plurality of symbols remain unchanged.

12. The device according to claim 1, wherein, in the adjustment mode,
the touch screen display is configured to display, on the first home screen, a plurality of symbols corresponding to a plurality of home screens, the plurality of symbols including the first, second and third symbols, and
the controller is configured to,
when the icon is placed, but not yet released, on a selected symbol among the plurality of symbols,
move the other symbols away from the selected symbol so that (i) distances between the selected symbol and symbols adjacent to the selected symbol are greater than a distance between each pair of adjacent symbols among the other symbols and (ii) the distance between adjacent symbols among the other symbols remains unchanged.

13. The device according to claim 1, wherein, in the adjustment mode,
the touch screen display is configured to display, on the first home screen, a plurality of symbols corresponding to a plurality of home screens, the plurality of symbols including the first, second and third symbols, and
the controller is configured to,
when the icon is placed, but not yet released, on a selected symbol among the plurality of symbols,
move the other symbols away from the selected symbol so that (i) two distances between the selected symbol and two symbols adjacent to the selected symbol are greater than a distance between each pair of adjacent symbols among the other symbols and (ii) only said two distances between the selected symbol and the two symbols adjacent to the selected symbol are increased.

14. A method for controlling a device including a touch screen display, the method comprising:
displaying, on the touch screen display, a first home screen on which an icon and a first symbol corresponding to a second home screen are arranged;
moving the icon to the second home screen corresponding to the first symbol upon detecting that the icon is placed and released on the first symbol; and
displaying, on the first home screen on the touch screen display, a second symbol corresponding to a third home screen to be created, in an adjustment mode in which an arrangement of icons on the displayed home screen is adjusted,
wherein, on the first home screen, a third symbol corresponding to the first home screen is displayed,
wherein, on the first home screen and before the icon is moved, the second symbol is displayed in a different manner from that of the first and third symbols,
wherein, when the icon is placed and released on the first symbol,
move the icon to the second home screen, and
keep displaying the first home screen,
wherein, when the icon is placed and released on the second symbol,
create the third home screen,
move the icon to the third home screen, and
keep displaying the first home screen, and
wherein, when the icon is kept in a stop state on an end portion of the first home screen for a period of a time longer than a threshold time,
display the second home screen, and
move said icon to the second home screen when said icon is placed and released on an area in the second home screen, said area excluding the first, second and third symbols.

15. A non-transitory storage medium that stores a program for causing, when executed by a device including a touch screen display, the device to execute:
displaying, on the touch screen display, a first home screen on which an icon and a first symbol corresponding to a second home screen are arranged;
moving the icon to the second home screen corresponding to the first symbol upon detecting that the icon is placed and released on the first symbol; and
displaying, on the first home screen on the touch screen display, a second symbol corresponding to a third home screen to be created, in an adjustment mode in which an arrangement of icons on the displayed home screen is adjusted,
wherein, on the first home screen, a third symbol corresponding to the first home screen is displayed,
wherein, on the first home screen and before the icon is moved, the second symbol is displayed in a different manner from that of the first and third symbols,
wherein, when the icon is placed and released on the first symbol,
move the icon to the second home screen, and
keep displaying the first home screen,
wherein, when the icon is placed and released on the second symbol,
create the third home screen,
move the icon to the third home screen, and
keep displaying the first home screen, and
wherein, when the icon is kept in a stop state on an end portion of the first home screen for a period of a time longer than a threshold time,
display the second home screen, and
move said icon to the second home screen when said icon is placed and released on an area in the second home screen, said area excluding the first, second and third symbols.

* * * * *